3,243,285
HIGH STRENGTH WELDING MATERIALS
William A. Fragetta, Orange, Charles E. Witherell, Bound Brook, and Donald A. Corrigan, Newark, N.J., assignors to The International Nickel Company, Inc., New York, N.Y., a corporation of Delaware
No Drawing. Filed Feb. 5, 1962, Ser. No. 171,277
5 Claims. (Cl. 75—123)

The present invention relates to high strength welds and/or welded structures and, more particularly, to high strength steel welds and the welding material for producing such high strength welds.

It is well known that a weld has been defined simply as a localized coalescence of metal wherein coalescence is produced by heating to suitable temperatures. Ordinarily, the heat required for coalescence produces numerous side effects which, depending upon the weldability characteristics of the metal being welded, often play a greater role in determining weld quality than perhaps any other factor.

In general, the side effects can be classified into at least three groups. Firstly, the solidification of molten and superheated weld metal is usually very rapid, such that the resulting structure, when solid, resembles that of a casting. As is well known, a casting is commonly characterized by segregation of the highest melting point constituents in the regions of the casting which solidify first. These high melting point constituents also segregate from the melt during cooling to form dendrites extending into the molten area. Necessarily, the frozen melt will be non-homogeneous since the dendrites will usually be rich in high-melting point constituents. Consequently, the response to any subsequent heat treatment which may be necessary will vary in different portions of the casting. This is, of course, detrimental. Secondly, the shrinking mass of cooling weld metal generates stresses within the weldment that vary with the location of the joint, its size, and cooling rate. Stresses are also introduced in and about a weld through metallurgical phase changes and accompanying volume changes, as the material cools. It is not unusual for these stresses to approach, and sometimes even exceed, the yield strength of the parent metal. If the weld metal, or parent metal adjacent to the weld, is not capable of sustaining these stresses, cracks in either the weld or base metal occur. Thirdly, the heat of welding raises the temperature of the parent metal close to the weld to temperatures that vary from the melting point to just above room temperature. Extremely large and/or steep thermal gradients often exist and often generate severe stresses. These steep gradients also produce a wide range of hardnesses and varying metallurgical structures in the heat-affected zone of the base metal.

The effects hereinbefore described have been at least partially responsible for much difficulty in welding the high strength steels of the prior art because the level of strength of these materials is usually attained at the expense of toughness and ductility. In other words, as a general rule, the higher the strength of the metal the more brittle it is, and the more brittle it is, the more difficult it is to weld even when only mildly restrained. To elaborate, while brittleness is not necessarily damaging it may be, and is oftentimes, a critical factor in the art of joining these high strength materials to each other or to another metal. For example, if a material has a tendency to be brittle, notches, scratches and depressions, even the rippled surface of weld beads, will likely induce brittle fracture. The most important characteristic of brittle fracture induced by notches, etc., is that it occurs at levels of gross stress that are substantially lower than the ultimate strength of the material. Therefore, it has been highly important in welding high strength steels to reduce the stresses introduced by welding.

In order to obviate the aforementioned stresses, the art turned to heating the weldments. Thus, the art adopted any means that would diminish the thermal gradients generated by the heat of welding, such as preheating and/or postheating the weld joint to minimize the resultant stresses in a weldment. While preheating and/or postheating is not particularly difficult to do with small assemblies or thin sections, it is almost prohibitively difficult of accomplishment with large structures of heavy section. Thus, the difficulty of reducing the weld stresses in heavy section applications has been a strong deterrent to the use of high strength steels for anything except relatively thin section, small assemblies.

Another problem confronting the art is that it is nearly always required to heat treat high strength steel weldments to provide a level of strength across the weld zone that approaches that of the parent metal. These heat treatments usually consist of an exposure to high temperatures for prolonged periods of time and often require a complex chain of operations to develop the desired properties. To apply a complex chain of heat treatment operations is not only uneconomical, but sometimes impossible because of the nature and/or condition of the article being welded. Accordingly, the field has been faced with an extremely formidable situation in welding high strength steels.

Although many attempts have been made to overcome the foregoing difficulties and other disadvantages, none, as far as we are aware, was entirely successful when carried into practice commercially on an industrial scale.

It has now been discovered that high strength, martensitic, substantially crack-free welds can be produced by employing a special welding material containing special ingredients in controlled amounts under particular conditions.

It is an object of the present invention to provide a high strength steel weld.

Another object of the invention is to provide a substantially crack-free, high strength welded structure.

The invention also contemplates providing a process for producing substantially crack-free, high strength welds and/or welded structures.

A further object of the invention is to provide a filler metal for use in inert-gas metal-arc welding which filler metal is particularly adapted for producing high strength substantially crack-free welds.

The invention further contemplates providing a unique inert-gas metal-arc welding process for producing martensitic iron-nickel welds.

It is another object of the invention to provide a welding material particularly adapted for producing high strength steel welds in the submerged arc welding process.

Still another object of the invention is to provide a special submerged arc welding method for producing substantially crack-free, high strength welds.

It is also an object of the invention to provide a coated electrode having a special core wire which electrode is particularly adapted for producing substantially crack-free, high strength welds that are substantially martensitic and carbon-free.

It is likewise within the contemplation of the invention to provide an improved nickel-containing steel welding electrode which electrode has a special flux coating containing, in novel combination, special proportions of ingredients.

Among the further objects of the present invention is the provision of a coated electrode having a special flux coating in unique combination with a novel core wire.

Other objects and advantages will become apparent from the following description:

Broadly stated, the present invention contemplates a welded structure having a high strength, martensitic, iron-nickel alloy weld and/or overlay deposit which is substantially crack-free and porosity-free. Advantageously, the welded structure can also comprise at least one base member of a maraging ferrous alloy, e.g., a low carbon martensitic iron-nickel alloy that can be age-hardened, such as those hereinafter set forth. However, a base member can also be made of ferrous alloy containing up to about 1% carbon and being characterized by a yield strength of at least 80,000 pounds per square inch (p.s.i.) as well as being made of unalloyed carbon steel or low alloy steels as hereinafter set forth. In general, the deposit affixed to the member contains, in percent by weight about 13% to about 20% nickel, e.g., about 15% to about 20%, about 2% to about 13% cobalt, about 2% to about 10% molybdenum, the summation of the cobalt and the molybdenum being about 6% to about 23%, up to about 2% titanium, e.g., up to about 1%, less than about 0.5% carbon, e.g., up to about 0.15%, up to about 2% aluminum, e.g., up to about 1%, less than about 1% silicon, e.g., up to about 0.5%, up to about 1.5% manganese, e.g., up to about 0.5%, with the balance essentially iron. In addition, the weld may also contain up to about 0.005% boron and up to about 0.01% zirconium. However, advantageously, the boron and zirconium are held to a maximum of about 0.003% and about 0.007%, respectively.

Advantageously, the deposit contains, by weight, about 17.5% to about 18.5% nickel, about 7.5% to about 8.5% cobalt, about 4% to about 5% molybdenum, up to about 1% titanium, up to about 1% aluminum, the sum of titanium and aluminum being about 0.2% to about 1%, e.g., about 0.2% to about 0.4%, less than about 0.03% carbon, less than about 0.1% silicon, less than about 0.01% phosphorus, less than about 0.01% sulfur, with the balance essentially iron. Such welds and/or overlays in the as-welded condition have excellent strengths, e.g., an ultimate tensile strength of at least about 150,000 p.s.i. In addition, these deposits have in the postweld heat-treated condition, i.e., when heated to about 850° F. to about 1000° F. for about one hour to about 3 hours, a martensitic structure, notched tensile strengths (N.T.S.) and ultimate tensile strengths (U.T.S.) of at least about 220,000 p.s.i. and a yield strength (Y.S.) at 0.2% offset of at least about 200,000 p.s.i. In general, a postweld heat treatment suitable for the welds or overlays comprises heating the weld and the heat-affected zone, i.e., the zone adjacent the deposit, at a temperature of about 800° F. to about 1000° F. for about 5 minutes to about 6 hours. Advantageously, the heat-affected zone and weld metal are subjected to a postweld heat treatment of about 1 hour to about 3 hours at about 850° F. to about 1000° F. in order to obtain the strengths heretofore mentioned. More advantageously, the postweld heat treatment comprises heating at about 900° F. for about 3 hours in order to provide optimum response.

Deposits having the foregoing composition can be produced by submerged arc welding, inert-gas metal-arc welding, including inert-gas tungsten-arc welding as well as arc-welding in an inert atmosphere with a bare metal electrode, and by arc-welding with a coated electrode.

When welding using the submerged arc welding process, the filler metal and/or wire contains the following ingredients in the amounts set fourth (in percent by weight) in Table I.

TABLE I

| Ingredient | Range | Advantageous range |
|---|---|---|
| Nickel | About 13 to about 20 | About 15 to about 20, e.g., about 17.5 to about 18.5. |
| Cobalt (Co) | About 2 to about 13 | About 7.5 to about 8.5. |
| Molybdenum (Mo) | About 2 to about 10 | About 4 to about 5. |
| Co+Mo | About 6 to about 23 | |
| Titanium (Ti) | Up to about 5 | Up to about 3. |
| Aluminum (Al) | do | Do. |
| Ti+Al | About 1 to about 5 | About 2 to about 3. |
| Carbon | Less than about 0.5 | Up to about 0.03. |
| Silicon | Less than about 1 | Up to about 0.1. |
| Manganese | Less than about 1.5 | Do. |
| Boron | Up to about 0.005 | Up to about 0.001. |
| Zirconium | Up to about 0.01 | Up to about 0.007. |
| Iron | Balance | Balance. |

Advantageously, the submerged arc filler metal of this invention contains less than about 0.01% sulfur, 0.1% manganese and 0.01% phosphorus.

According to this invention, in welding by the submerged arc process any of the commercially available metallurgically neutral fluxes may be used, especially those fluxes which are free from substances capable of evolving large amounts of gas. However, the particular type of flux used depends upon the particular type of job to be welded, e.g., procedure employed, type of joint and the exact composition of the material to be welded.

Submerged arc filler metals having compositions within the ranges heretofore mentioned in Table I are particularly advantageous since they allow the production of substantially crack-free and porosity-free welds at rates up to about 100 pounds per hour. Of course, as is well known in the art, for optimum properties certain rate adjustments are made. In addition, these filler metals can be used for joining very large sections, e.g., one inch, and even higher, even when the metal to be welded is under severe restraint.

The coated electrode for producing welds and/or overlays by electric arc welding having the composition hereinbefore set forth, like the filter metal for use in the submerged arc process, comprises a nickel-containing steel core, and, it is, of course, designed to be used with a flux. According to this invention, the core wire of the coated electrode contains about 13% to about 20% nickel, e.g., about 15% to about 20%, about 2% to about 13% cobalt, about 2% to about 10% molybdenum, the sum of the cobalt plus the molybdenum being at least about 6%, up to about 5% titanium, less than about 0.5% carbon, less than about 1% silicon, less than about 1.5% manganese, up to about 5% aluminum, the sum of aluminum and titanium being about 1% to about 5%, less than about 0.005% boron, less than about 0.01% zirconium with the balance essentially iron.

The ingredients in the proportions hereinbefore set forth for both welding materials for use with a flux, i.e., the submerged-arc filler metal and the core wire for the coated electrode, are essential to the present invention. It is only when the welding material contains such ingredients in the aforementioned proportions that there is an assurance of producing high strength welds that are substantially crack-free and porosity-free in accordance with this invention. While both titanium and aluminum can be present in the welding materials, the essential requirement is that at least one of these elements be present and that the total amount of both be between about 1% and about 5% since either or both of these ingredients, in combination with the remainder of the ingredients, is primarily responsible for minimizing the tendencies toward hot-cracking and porosity. Advantageously, for optimum properties particularly in welding heavily restrained and/or thick sections, titanium or aluminum, or both, is present in the welding materials in amounts of about 2% to about 3%. While either or both of these elements is essential to the welding materials of this invention, it is not necessary that any specific amount of either titanium or aluminum, or both, be recovered in the deposits in order to obtain substantially crack-free and porosity-free deposits. In general, about 10% to about 35% of any titanium or aluminum present in the welding material is recovered in the weld deposits when welding with a coated electrode.

Advantageously, the coated electrode of this invention comprises a nickel-containing steel core wire and a flux coating. The core wire contains, in percent by weight, about 17.5% to about 18.5% nickel, about 7.5% to about 8.5% cobalt, about 4% to about 5% molybdenum, up to about 3% titanium, up to about 3% aluminum, the summation of aluminum plus titanium being about 2% to about 3%, up to about 0.03% carbon, about 0.1% silicon, up to about 0.1% manganese, less than about 0.01% phosphorus and less than about 0.01% sulfur. Advantageously, the boron and zirconium are held to a minimum, i.e., less than about 0.001% boron and 0.007% zirconium. Advantageously, the core wire is vacuum melted. However, an air-melted wire is also operable and within the scope of the present invention.

Known flux compositions having flux-forming and slag-forming ingredients may be used as the coating in combination with the core wire of this invention, as those skilled in the art will readily understand. One particular advantageous flux for use with the aforementioned core wire having compositions either within the broad or advantageous range contains the ingredients in the amounts set forth (in percent by weight of the dry flux) in Table II.

TABLE II

| Ingredients | Range | Advantageous range |
|---|---|---|
| Alkaline earth metal carbonate selected from the group consisting of calcium carbonate, barium carbonate, strontium carbonate and combinations thereof. | About 25 to about 45 | 30 to 40. |
| Cryolite | About 30 to about 50 | 35 to 45. |
| Titanium dioxide (rutile) | Up to about 30 | Up to about 20. |

While the flux for the coating can contain titanium dioxide as shown in Table II, the flux is substantially devoid of elemental and/or metallic titanium. Advantageously, the alkaline earth metal carbonate employed in the flux of this invention is calcium carbonate since it imparts greater operability to the electrode. The ingredients used in making the flux are advantageously powdered ingredients. In general, the mixed ingredients usually have a particle size of between about 60 microns and about 300 microns. The electrode coating having this combination of ingredients affords optimum operability and in conjunction with the core wire provides the desired high level of weld and/or overlay quality in combination with excellent operability. In addition to the foregoing ingredients tabulated in Table II, extrudability aids such as bentonite or similar colloidal clays and humectants such as alginates, gums, glycolates, sodium carboxymethyl cellulose, etc., can be added to the dry flux in amounts totalling up to about 5% of the coating.

A water dispersible binder ordinarily is employed with the flux to provide a durable and hard coating on the core wire after drying and baking. The binder, advantageously, is of the silicate type as it produces a durable coating, i.e., a coating that is resistant to mechanical damage but does not require a rebake prior to use. The silicate binder may be an aqueous solution of sodium silicate and/or potassium silicate. The following Table III gives the amount (in percent by weight of the dry flux) which can be used for the binder. It is to be appreciated, as those skilled in the art will readily understand, that a silicate solution of a different specific gravity than shown herein can also be used.

TABLE III

| Ingredient | Range | Example |
|---|---|---|
| Sodium silicate solution (47° Baumé). | About 10 to about 20 | 15 |
| Water | As needed to provide extrudable consistency. | 2 |

The flux coating can be applied to the core wire in any suitable manner, e.g., by an extrusion process, and dried on the wire surface by suitable drying and/or baking. This results in a hard adherent coating of high mechanical strength relatively resistant to mechanical damage under normal handling conditions. A satisfactory drying or baking treatment of the flux and binder mixture comprises a normal continuous oven drying treatment followed by a baking treatment comprising gradually raising the temperature to about 600° F. and holding at that level for about two hours.

Examples of typical coated electrode dimensions (core diameter plus flux thicknesses) are given in Table IV. All dimensions therein contained are in inches.

TABLE IV

| Core diameter | Electrode diameter, range | Electrode diameter, example |
|---|---|---|
| 3/32 | 0.12 to 0.15 | 0.13 |
| 1/8 | 0.17 to 0.2 | 0.18 |
| 5/32 | 0.21 to 0.23 | 0.22 |
| 3/16 | 0.25 to 0.27 | 0.26 |

However, it is permissible, as will be apparent to those skilled in the art, to vary considerably the core diameter-flux thickness relationships from those given in the preceding table. However, the flux coating usually constitutes from about 25% to about 35% by weight of the electrode including the slag-forming and flux-forming ingredients.

The welds and/or overlays produced using the advantageous coated electrode of this invention are postweld heat treated by heating to between about 850° F. to about 1000° F. for about one hour to about 3 hours and, advantageously, by heating to about 900° F. for about 3 hours. These postweld heat treated welds have notched and ultimate tensile strengths in excess of 220,000 p.s.i. and a yield strength in excess of 200,000 p.s.i. When using this electrode no preheat treatment of the base metal is necessary and low interpass temperature, i.e., the lowest temperature of the deposited weld metal before the next pass is started, can be used without any adverse effects. Thus, an interpass temperature as low as about 100° F. or lower does not adversely affect the weld strength or quality.

The filler wire for use in inert-gas arc welding, including inert-gas tungsten-arc welding and inert-gas filler metal electrode-arc welding, to produce welds having compositions as heretofore mentioned contains, by weight, about 13% to about 20% nickel, about 2% to about 13% cobalt, about 2% to about 10% molybdenum, the summation of cobalt plus molybdenum being at least about 6%, up to about 0.5% titanium, up to about 0.5% aluminum, the sum of titanium plus aluminum being about 0.1% to about 0.5%, less than about 0.5% carbon, up to about 1% silicon, less than about 1.5% manganese with the balance essentially iron. In addition, boron and zirconium may be present in amounts of about 0.005% and about 0.01%, respectively. Advantageously, the boron content is not more than about 0.003% and the zirconium content is not more than about 0.007% since each of these elements detrimentally affects the weld quality. It is to be noted that while both titanium and aluminum can be present in the inert-gas arc welding filler metal of this invention, the essential requirement is that at least one of these elements be present and that the total amount of both be between about 0.1% to about 0.5% to insure substantial freedom from cracking and/or porosity. In this connection, while titanium or aluminum or both titanium and aluminum are essential in the inert-gas filler metal of this invention, it is unnecessary to recover either or both of these elements in the deposits although up to 90% may be recovered in the deposit. Hence, deposits produced by the inert-gas arc welding filler metals of this invention can contain up to about 0.4% titanium, e.g., about 0.2% to about 0.4%, and up to 0.4% aluminum, e.g., about 0.2% to about 0.4%.

When it is desired to make welds in heavily restrained joints, e.g., in heavy sections of more than about one inch thick, and where high weld quality, i.e., freedom from porosity and cracking tendencies, is a requirement, the filler wire for the inert-gas metal-arc process is advantageously vacuum-melted metal. Vacuum melting has the effect of eliminating transverse cracking sensitivity in heavily restrained and/or thick weldments. Advantageously, the vacuum-melted filler wire contains, by weight, about 17.5% to about 18.5% nickel, about 7.5% to about 8.5% cobalt, about 4% to about 5% molybdenum, up to about 0.5% titanium, up to about 0.5% aluminum, the sum of aluminum plus titanium being about 0.35% to about 0.5%, less than about 0.03% carbon, less than about 0.1% silicon, less than about 0.01% phosphorus, less than about 0.01% sulfur with the balance essentially iron.

Each of the aforementioned vacuum-melted filler wire ingredients in the aforementioned special proportions serves a special function in combination with each other ingredient of the vacuum-melted filler wire. For example, titanium or aluminum or both in amounts of at least about 0.35% is necessary to eliminate porosity and longitudinal hot-cracking when welding thick and/or heavily restrained sections. In this connection, the titanium, the aluminum and the summation of aluminum plus titanium cannot, however, be raised to more than about 0.5% since cracking sensitivity again will appear to develop in welds produced by inert-gas metal-arc welding. In addition, when either or both of these elements in total exceed 0.5%, some surface weld oxide is encountered which is, of course, detrimental. It is when the foregoing advantageous combination of ingredients in special proportions are adhered to in the inert-gas metal-arc welding process that welds having N.T.S. and U.T.S. in excess of 220,000 p.s.i. and Y.S. (0.2% offset) in excess of 200,000 p.s.i. after heat treatment in the manner hereinbefore set forth are obtained. In addition, such welds are substantially crack-free and porosity-free even when they are heavy restrained and/or of thick cross-section, e.g., one inch thick or greater. Moreover, these welds are very strong in the as-welded condition, i.e., they have notched tensile strengths in excess of 150,000 p.s.i.

The gas used with this filler metal in the inert-gas metal-arc welding process must be substantially free of hydrogen, oxygen, nitrogen, carbon monoxide, and carbon dioxide, i.e., it must be inert to the welding materials, base materials, etc. Advantageously, the gas is pure argon or pure helium or combinations thereof containing less than about 0.1% by volume in total of hydrogen, carbon monoxide, nitrogen, oxygen and carbon dioxide.

In addition, it is advantageous that the metallic welding materials of this invention be substantially devoid of hydrogen. One method of insuring good weld and/or overlay deposits using the welding materials of this invention is to heat, i.e., bake, the welding materials for about 10 to about 20 hours at a temperature of about 400° F. to about 650° F.

For the purpose of giving those skilled in the art a better understanding of the invention and a better appreciation of the advantages of the invention, particularly in welding the maraging steels, the following illustrative examples are hereinafter set forth.

*Example I*

A butt joint was welded by the submerged arc process using fully hardened one-half inch plate having a hardness of about 50 Rockwell C (Rc) containing 18.6% nickel, 7.0% cobalt, 4.5% molybdenum, 0.22% titanium, 0.031% carbon, 0.11% silicon, 0.085% aluminum, 0.008% phosphorus, 0.010% sulfur. The submerged arc filler wire used contained 15.8% nickel, 7.5% cobalt, 4.9% molybdenum, 2.2% titanium, 0.012% carbon, less than 0.05% silicon, about 0.05% aluminum, about 0.005% phosphorus, about 0.01% sulfur and had a 5/32" diameter. The plate was placed under severe restraint, that is, the plate was rigidly clamped to a 6" thick steel platen during welding. Welds were made without preheat in two passes, one from each side of the V joint, using a single-wire feed submerged arc at about 450 amperes, direct current reversed polarity and a commercially available neutral flux marketed for arc welding of steels. No distortion of the joints could be observed after welding.

The joint was sectioned transversely into eight ½" wide slices. The cross sections were polished and etched and examined at a magnification of 30 diameters (30×). This examination showed no cracks, porosity or other defects. These slices were then age hardened at 900° F. for three hours, air cooled and examined at 30×. The examination revealed no cracks, porosity or other defects. Notched and unnotched specimens were then machined from these slices. The notched tensile specimen had a 0.300" diameter and had been notched to a 60° V notch in the center of the weld to a depth affording a diameter at the notch of about 0.212". The radius at the base of the notch was 0.0006". The unnotched tensile specimen had a diameter of 0.252".

These transverse weld specimens were then tested to fracture at room temperature. The results of these tests are included in Table V.

TABLE V

| N.T.S. (p.s.i.) | 0.2% Y.S. (p.s.i.) | U.T.S. (p.s.i.) | Elongation in 1" (percent) | Reduction in area (R.A.) percent | Location of fracture |
|---|---|---|---|---|---|
| 232,300 | 225,500 | 232,900 | 9 | 47 | Plate |

The complete freedom from cracking of these butt welds in fully hardened plate and the unusually high tensile properties shown in Table V clearly demonstrate the suitability of this filler wire for obtaining high strength and sound weldments by the submerged arc process.

Example II

A butt joint was welded by the submerged arc process in fully hardened 1" thick plate of about 50 Rockwell C having the same composition as the plate in Example I, and using a filler wire having a composition identical to the filler wire of Example I. In addition, to flux and the welding conditions were the same as in Example I except that a welding current of about 650 amperes was used.

The completed joint was sectioned and evaluated in the same manner as the ½" weld in Example I. No cracks, porosity or defects of any kind were observed in the polished and etched cross sections at a magnification of 30×. These results in the 1" thick fully hardened plate under heavily restrained conditions further demonstrate the suitability of this filler wire for obtaining sound welds by the submerged arc welding process.

Example III

A butt weld was prepared using the inert-gas metal-arc process and 0.062" diameter vacuum melted filler wire containing about 18% nickel, about 8% cobalt, about 4.5% molybdenum, about 0.45% titanium, about 0.1% aluminum with the balance essentially iron. The filler wire was substantially devoid of boron, carbon, phosphorus, and silicon. The gas used was argon and it contained less than 0.1% by volume in total of hydrogen, nitrogen, carbon monoxide, carbon dioxide and oxygen.

Fully hardened ½" thick plate material having the same composition as that set forth in Example I was used. The plate was clamped securely to a 6" thick steel platen during welding. No preheat or postheat was necessary. Weld interpass temperature was maintained at less than 250° F. No distortion of the joints could be observed after welding.

The weld was cross sectioned and examined in a manner similar to that described in Example I and no cracks, porosity or other defects of any kind were observed. The results obtained at room temperature on specimens machined from the transverse slices cut from the weld that had been age hardened at 900° F. for 3 hours and then air cooled are shown in Table VI.

TABLE VI

| Specimen type | 0.2% Y.S. (p.s.i.) | U.T.S. (p.s.i.) | Elongation in 1" (percent) | R.A. (percent) | Location of fracture |
|---|---|---|---|---|---|
| Transverse weld. | 226,700 | 236,800 | 12 | 51 | Fusion line. |
| All-weld metal. | 220,600 | 235,300 | 8 | 29 | |

These results indicate the usefulness of this vacuum melted filler wire composition for obtaining sound, high strength gas metal-arc welds. In addition, an air-melted wire having a composition substantially the same as the vacuum melted filler wire produced deposits having 5% elongation and 32% reduction in area in a transverse weld specimen.

Example IV

A butt joint was also welded by gas metal-arc process in fully hardened 1" thick plate of the same hardness and composition as that of Example I using a vacuum melted filler wire having a composition as set forth for the vacuum melted filler wire of Example III. The joint was welded in the same manner under the same conditions as used for the butt joint made in ½" thick plate described in Example III. Macroexamination at 30× of the polished and etched cross sections indicated complete freedom from cracks, porosity and other defects, thus demonstraining the complete suitability of this vacuum melted filler wire electrode.

Example V

A butt weld was made under severe restraint, i.e., the plates were ½" thick and were rigidly clamped to a 6" thick steel platen during welding, using fully hardened plate (50 Rockwell C) having a composition identical to that of the plate of Example I and a 5/32" diameter flux-coated electrode. The core wire of the electrode contained about 18% nickel, about 8% cobalt, about 4.5% molybdenum, about 2.2% titanium, about 0.1% aluminum with the balance essentially iron. The flux contained 47% calcium carbonate, 50% cryolite, 3% bentonite and a binder consisting of an aqueous solution of sodium silicate 15% by weight of the dry flux. No preheat or postheat was used and the weld interpass was held to less than 250° F. No distortion of the joint could be observed after welding.

When the joint was completed it was cut into 8 transverse cross section slices each of which was ½" wide. These sections were polished and etched and examined at a magnification of 30× and were found to be completely free of cracks, porosity and any other defects. These slices were then age-hardened at 900° F. for 3 hours and machined into notched and unnotched tensile strength specimens identical to those described in Example I. The results of subsequent tensile strength tests conducted at room temperature are listed in Table VII.

TABLE VII

| N.T.S. (p.s.i.) | 0.2% Y.S. (p.s.i.) | U.T.S. (p.s.i.) | Elongation in 1" (percent) | Reduction in area (R.A.) percent | Location of fracture |
|---|---|---|---|---|---|
| 276,300 | 226,300 | 235,200 | 5 | 20 | Plate |

Example VI

A butt weld was made in 1" thick plate using a coated electrode of the composition listed in Example V on fully hardened plate of the same composition and under the same welding conditions as described in Example V. After cross sectioning the completed weld in 8 places and examining the polished and etched cross sections at 30× the weld was found to be completely free of cracks, porosity and any other defects.

Example VII

Butt welds ½" thick were made in ½" plate under conditions similar to those described in Example V except that the coated electrode had a core wire of an adjusted composition to produce a deposit having favorable impact properties. The core wire had a composition of 18% nickel, 7.65% cobalt, 2.2% molybdenum, 2.32% titanium, 0.019% carbon and less than 0.1% manganese, 0.1% silicon, the balance essentially iron and the flux coating contained 50% cryolite, 47% calcium carbonate, 3% bentonite and a sodium silicate binder.

The butt joints were sectioned into ½" wide slices and given various postweld heat treatments ranging from 1 hour at 300° F. to 3 hours at 900° F. The purpose of this range of heat treatment was to evaluate the properties of welds given various postweld aging treatments. These specimens were tested at room temperature. The results of these tests are listed in Table VIII.

6.5% cobalt, about 7.5% molybdenum, about 0.3% titanium, about 0.02% carbon with the balance essentially

TABLE VIII

| Weld Test Number | Postweld heat treatment | | Weld metal hardness after heat treatment Rockwell C | 0.2% Y.S. (p.s.i.) | U.T.S. (p.s.i.) | Elongation in 1" (percent) | Reduction in area (percent) | Charpy V-Notch impact resistance at room temperature (foot-pounds) |
|---|---|---|---|---|---|---|---|---|
| | Time (hrs.) | Temp. (° F.) | | | | | | |
| 1 | (1) | (1) | 2 37 | 142,200 | 157,600 | 3 | 7 | 31 |
| 2 | 1 | 300 | 38 | 140,200 | 158,400 | 3 | 9 | 34 |
| 3 | 1 | 500 | 38 | 145,300 | 163,600 | 10 | 33 | 30 |
| 4 | 1 | 700 | 41 | 164,500 | 181,800 | 12 | 43 | 17 |
| 5 | 1 | 800 | 46 | 181,600 | 194,800 | 10 | 34 | 15 |
| 6 | 1 | 900 | 42 | 197,400 | 206,000 | 10 | 39 | 18 |
| 7 | 3 | 900 | 47 | 209,700 | 217,800 | 9 | 15 | 14 |

[1] As-welded.  [2] As-welded hardness.

The results summarized in Table VIII indicate the versatility of this composition in obtaining the unusual as-welded Y.S. of over 140,000 p.s.i., as-welded U.T.S. of over 150,000 p.s.i., e.g., 157,000 p.s.i. and higher, in combination with as-welded Charpy V-notch impact resistance at room temperature of over 30 ft.-lbs. After a 3-hour aging at 900° F. the same weld composition afforded a Y.S. of nearly 210,000 p.s.i. and U.T.S. of 217,000 p.s.i. and good ductility for a weld of this strength level. It is to be noted that the molybdenum content was only 2.2% since this amount of molybdenum in combination with the remainder of the electrode produces deiron. The X-weld crack test was used since it is an extremely severe test which gives a reliable indication of the presence and/or absence of longitudinal cracking. No preheat was used and the interpass temperature was held to below 250° F. After welding, the specimens were examined for weld cracking and other defects. In addition, hardness determinations were made of the deposits in the as-welded condition. After these had been determined, a portion of each X-weld was given a three hour 900° F. marage and again tested for weld hardness. The results of these tests are set forth in Table IX.

TABLE IX

| Weld Test No. | Core wire variable | | Weld metal recovery | | Weld metal hardness, Rc | | Weld porosity | Longitudinal weld cracking, cracks per X-weld section |
|---|---|---|---|---|---|---|---|---|
| | Percent Ti | Percent Al | Percent Ti | Percent Al | As-welded | Maraged | | |
| 8 | <0.1 | | <0.1 | | 30 | 36 | Gross | >40 |
| 9 | 0.49 | | <0.1 | | 30 | 35 | Slight | >40 |
| 10 | 1.00 | | 0.17 | | 31 | 38 | None | >40 |
| 11 | 1.39 | | 0.19 | | 36 | 41 | do | 21.4 |
| 12 | 1.84 | | 0.22 | | 32 | 40 | do | 4 |
| 13 | 2.96 | | 0.81 | | 33 | 47 | do | None |
| 14 | | <0.03 | | <0.01 | 30 | 41 | Gross | >40 |
| 15 | | 0.5 | | <0.1 | 29 | 42 | do | >40 |
| 16 | | 0.99 | | 0.14 | 33 | 42 | do | >40 |
| 17 | | 1.55 | | 0.24 | 36 | 47 | do | 8.5 |
| 18 | | 2.15 | | 0.43 | 32 | 47 | do | 8 |
| 19 | | 3.43 | | 0.8 | 37 | 50 | do | None | posits having excellent N.T.S. even though the U.T.S. and Y.S. were somewhat lower than the optimum.

Example VIII

In order to illustrate the effects of titanium and aluminum in the coated electrode welding material of this invention two series of welding tests were conducted using core wires containing varying amounts of titanium in one series and varying amounts of aluminum in the other series. The core wire used in the titanium series contained, in addition to titanium, about 18.5% nickel, about 3.5% cobalt, about 5% molybdenum, about 0.05% carbon, about 0.2% aluminum, about 0.1% manganese, about 0.1% silicon with the balance essentially iron. The core wires used in the aluminum-effect tests contained, in addition to aluminum, about 18.5% nickel, about 3.5% cobalt, about 5% molybdenum, about 0.05% carbon, about 0.4% titanium, about 0.1% manganese, about 0.1% silicon with the balance essentially iron. Each of the core wires for each series had a diameter of 5/32" and was extrusion-coated with a mixture of 47% calcium carbonate, 50% cryolite, 3% bentonite and a sodium silicate binder.

The electrodes of the two series of core wires were evaluated in X-weld crack tests on two 1" x 1" x 3" blocks of aged martensitic steel having a hardness of about 46 Rc and containing about 18.5% nickel, about The data clearly shows the beneficial effects of titanium and/or aluminum in reducing longitudinal weld cracking in heavy sections using coated arc-welding electrodes. In addition, it is to be noted that excessively low titanium (Weld #8) or excessively low aluminum (Weld #14) caused severe weld porosity as well as longitudinal cracking.

Example IX

Tests similar to those in Example VIII, supra, were also conducted to illustrate the effects of titanium on longitudinal weld cracking in heavy sections using air-melted inert-gas metal-arc welding filler metal having a diameter of about 0.062". Each filler wire contained, in addition to varying titanium, about 18% nickel, about 8% cobalt, about 4.7% molybdenum, less than 0.05% manganese, about 0.05% silicon, about 0.01% carbon, less than about 0.15% aluminum with the balance essentially iron. The gas used was argon and it contained less than 0.1% by volume in total of hydrogen, nitrogen, carbon monoxide, carbon dioxide and oxygen. The X-welds were made by depositing weld metal between two 1" x 1" x 6" bars of fully hardened martensitic steel containing 18.6% nickel, 7.0% cobalt, 4.5% molybdenum, 0.22% titanium, 0.01% manganese, 0.11% silicon, 0.031% carbon, 0.01% sulfur, 0.008% phosphorus, 0.085% aluminum, 0.003% boron, less than 0.01% zirconium with the balance essentially iron. All other welding conditions were similar to those of Example VIII, supra. The results (as well as filler wire compositions) are set forth in Table X.

TABLE X

| Weld Test No. | Percent Ti in filler wire | Longitudinal weld cracking, cracks per cross section | Porosity |
|---|---|---|---|
| 15 | 0.18 | None | Some. |
| 16 | 0.57 | None | Very low. |
| 17 | 0.83 | 2.5 | Do. |
| 18 | 0.97 | 5.0 | Do. |
| 19 | 1.1 | 1.25 | Do. |
| 20 | 1.66 | 3.25 | Do. |

From the foregoing Table X it is to be noted that when about 0.83% titanium is present, longitudinal weld cracking appears to develop. While 0.18% titanium shows no longitudinal weld cracking, there was some porosity in the welds produced using a filler wire having that low a level of titanium. In order to eliminate porosity as well as longitudinal cracking in heavy section weldments, it is necessary to go to higher titanium contents, e.g., 0.35%.

The present invention is particularly applicable to the welding and overlaying, even in heavy sections, e.g., up to one inch thick and thicker, and under severe restraint, of martensitic, aged iron-nickel alloys, i.e., maraging ferrous base alloys or steels which comprise an iron matrix containing about 10% to about 25% nickel capable of being transformed from the austenitic condition at elevated temperatures to the martensitic or a martensitic-like condition, for example, by cooling to room temperature, refrigerating and/or cold working. The matrices of these maraging ferrous base alloys are alloyed with one or more hardening elements such as silicon, carbon, beryllium, aluminum, titanium, columbium, tantalum, molybdenum, vanadium, nitrogen, cobalt, tungsten and copper in amounts capable of being retained in solid solution in the martensitic matrix upon transformation and capable of being activated to harden the alloy by aging at a temperature below that temperature at which the matrix will revert to austenite. The alloy usually contains carbon in amounts from about 0.002% up to about 0.1% and not more than about 0.2% each of silicon and manganese. The alloy can also contain chromium with the general proviso that when chromium is present in amounts greater than about 1% the sum of the percentage of nickel and chromium is less than about 23% or 24%. Examples of maraging alloys which the welding materials of this invention are particularly adapted to weld are those that are hardened with aluminum and/or titanium, e.g., in amounts of up to about 7% each, the sum of aluminum and titanium being between about 1.5% to about 7%, and those that are aged with about 2% to about 30% cobalt and about 1% to about 15% molybdenum with the product of cobalt percentage times the molybdenum percentage being about 10 to about 100. A particularly advantageous maraged alloy hardened with titanium and/or aluminum contains, in addition to about 1.5% to about 7% of titanium plus aluminum, about 18% to about 30% nickel, up to about 2% columbium, up to about 0.1% carbon, up to about 0.2% manganese, up to about 0.2% silicon, up to about 10% cobalt, up to about 0.05% calcium, up to about 0.05% boron, up to about 0.1% zirconium, up to about 0.25% vanadium with the balance iron. A particularly advantageous maraged alloy hardened with cobalt and molybdenum in the aforementioned amounts contains, in addition to cobalt and molybdenum, about 10% to about 25% nickel, up to about 8% chromium, provided that when chromium is present the summation of nickel and chromium is about 10% to about 23%, up to about 0.15% carbon, up to about 0.1% nitrogen, up to about 2% copper, up to about 2% tungsten, up to about 6% vanadium, up to about 3% columbium, up to about 3% titanium, up to about 3% aluminum, up to about 2% beryllium, up to about 0.2% silicon, up to about 0.25% manganese, up to about 0.1% boron, up to about 0.25% zirconium, up to about 0.1% calcium with iron balance and greater than any other element, and the elements other than nickel, cobalt, molybdenum and iron being preferably less than about 10% total. In addition, the present invention is applicable to the welding of iron alloys such as carbon steel, low alloy steels, etc., containing from about 90% to about 100% iron, up to about 6% nickel, up to about 5% molybdenum, up to about 6% chromium, up to about 3% vanadium, up to about 0.6% carbon, up to about 1% silicon, up to about 3% manganese and up to about 0.5% copper.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A vacuum melted filler wire for use in the inert-gas arc welding of high strength, martensitic, iron-nickel alloys and being characterized in use by the production of substantially crack-free welds having an ultimate tensile strength in the as-welded condition of at least about 150,000 p.s.i. and an ultimate tensile strength and notched tensile strength in the heat-treated condition in excess of 220,00 p.s.i., said filler wire being made of a substantially hydrogen-free alloy consisting essentially of, by weight, about 17.5% to about 18.5% nickel, about 7.5% to about 8.5% cobalt, about 4% to about 5% molybdenum, up to about 0.5% titanium, up to about 0.5% aluminum, the sum of titanium plus aluminum being about 0.35% to about 0.5%, less than about 0.03% carbon, less than about 0.1% silicon, less than 0.1% manganese, less than about 0.01% phosphorus, less than about 0.01% sulfur, less than about 0.003% boron, less than about 0.007% zirconium with the balance essentially iron.

2. A welding metal for use in flux-shielded welding processes made of a substantially hydrogen-free alloy consisting essentially of, by weight, about 17.5% to about 18.5% nickel, about 7.5% to about 8.5% cobalt, about 4% to about 5% molybdenum, up to about 3% titanium, up to about 3% aluminum, the sum of titanium and aluminum being about 2% to about 3%, up to about 0.03% carbon, up to about 0.1% silicon, less than about 0.1% manganese, less than about 0.01% sulfur, less than about 0.01% phosphorus, up to about 0.001% boron, up to about 0.007% zirconium with the balance essentially iron, said welding metal being characterized in use by the production of substantially crack-free welds having an ultimate tensile strength in the as-welded condition of at least about 150,000 p.s.i. and an ultimate tensile strength and notched tensile strength in the heat-treated condition in excess of 220,000 p.s.i.

3. In the process for producing by welding a composite structure including at least one member made of a maraging steel, the improvement which comprises forming a weld in said structure using an inert-gas-shielded welding process wherein the inert gas atmosphere employed contains less than 0.1%, by volume, of gases from the group consisting of hydrogen, oxygen, nitrogen, carbon monoxide and carbon dioxide and using as filler material a vacuum-melted alloy substantially free from hydrogen consisting essentially, by weight, of iron, about 13% to about 20% nickel, about 2% to about 13% cobalt, about 2% to about 10% molybdenum, with the sum of cobalt plus molybdenum being at least about 6%, up to about 0.5% titanium, up to about 0.5% aluminum, with the sum of aluminum plus titanium being about 0.1% to about 0.5%, less than about 0.5% carbon, up to about 1% silicon, and less than about 1.5% manganese, whereby an age-hardenable weld is produced which is substantially free from cracking and porosity and which possesses high strength and high notch ductility in the as-welded condition even when no preheat is employed.

4. In the process for producing by welding a composite structure including at least one member made of a maraging steel, the improvement which comprises forming a weld in said structure using a flux-shielded welding process and using as a filler material an alloy substantially free from hydrogen consisting essentially, by weight, of iron, about 13% to about 20% nickel, about 2% to about 13% cobalt, about 2% to about 10% molybdenum, with the sum of cobalt plus molybdenum being at least about 6%, up to about 5% titanium, up to about 5% aluminum, with the sum of aluminum plus titanium being at least about 1% but not more than about 5%, less than about 0.5% carbon, less than about 1% silicon, and less than about 1.5% manganese, whereby an age-hardenable weld is produced which is substantially free from cracking and porosity and which possesses high strength and high notch ductility in the as-welded condition even when no preheat is employed.

5. A vacuum melted filler wire for use in the inert-gas arc welding of high strength, martensitic, iron-nickel alloys and being characterized in use by the production of substantially crack-free and porosity-free welds which are heat-treatable to a high strength level by a simple heat treatment, said filler wire being made of a substantially hydrogen-free alloy consisting essentially of, by weight, about 13% to about 20% nickel, about 2% to about 13% cobalt, about 2% to about 10% molybdenum, with the sum of cobalt plus molybdenum being at least about 6%, up to about 0.5% titanium, up to about 0.5% aluminum, with the sum of aluminum plus titanium being about 0.1% to about 0.5%, less than about 0.5% carbon, up to about 1% silicon, less than about 1.5% manganese, and the balance essentially iron.

References Cited by the Examiner
UNITED STATES PATENTS

| | | | |
|---|---|---|---|
| 1,352,534 | 9/1920 | Russell | 75—123 |
| 1,556,776 | 10/1925 | Flintermann | 75—123 |
| 1,715,542 | 6/1929 | Elmen | 75—123 X |
| 1,715,543 | 6/1929 | Elmen | 75—123 X |
| 2,105,655 | 1/1938 | Hondo | 75—124 |
| 2,105,657 | 1/1938 | Hondo | 75—122 X |
| 2,114,781 | 4/1938 | Kanz | 75—122 |
| 2,172,548 | 9/1939 | Schwarzkopf | 75—123 X |
| 2,233,455 | 3/1941 | Larson | 75—123 X |
| 2,432,773 | 12/1947 | Lee | 75—123 X |
| 2,504,453 | 4/1950 | Rotherham et al. | 75—171 |
| 2,673,310 | 3/1954 | Dannohl | 75—124 X |
| 2,871,552 | 2/1959 | Noien | 75—170 |
| 3,062,948 | 11/1962 | Arnoldy | 219—76 |

DAVID L. RECK, *Primary Examiner.*

WINSTON A. DOUGLAS, *Examiner.*

N. F. MARKVA, P. WEINSTEIN, *Assistant Examiners.*